United States Patent
Guo et al.

(10) Patent No.: US 11,417,480 B2
(45) Date of Patent: Aug. 16, 2022

(54) ELECTRODE FOR A CIRCUIT BREAKER AND THE CIRCUIT BREAKER

(71) Applicant: Eaton Electrical Ltd., Jiangsu (CN)

(72) Inventors: Shunfeng Guo, Jiangsu (CN); Hui Zhou, Jiangsu (CN); Zuhui Li, Jiangsu (CN)

(73) Assignee: Eaton Electrical Ltd., Suzhou (CN)

( * ) Notice: Subject to any disclaimer, the term of this patent is extended or adjusted under 35 U.S.C. 154(b) by 36 days.

(21) Appl. No.: 16/941,904

(22) Filed: Jul. 29, 2020

(65) Prior Publication Data

US 2021/0035754 A1 Feb. 4, 2021

(30) Foreign Application Priority Data

Jul. 30, 2019 (CN) .......................... 201921211364.9

(51) Int. Cl.
*H01H 33/42* (2006.01)
*H01H 33/59* (2006.01)
*H02H 3/087* (2006.01)

(52) U.S. Cl.
CPC ............ *H01H 33/42* (2013.01); *H01H 33/59* (2013.01); *H02H 3/087* (2013.01)

(58) Field of Classification Search
CPC ...... H01H 33/42; H01H 33/59; H01H 33/182; H01H 1/2041; H01H 9/443; H01H 9/34; H01H 9/346; H01H 9/302; H01H 73/045; H01H 73/18; H01H 9/44
USPC ........ 218/1, 4, 5, 15–17, 20, 22, 23, 26, 27, 218/30–32
See application file for complete search history.

(56) References Cited

U.S. PATENT DOCUMENTS

| | | | |
|---|---|---|---|
| 9,299,509 B2 * | 3/2016 | Coquil | H01H 1/2041 |
| 9,406,465 B1 * | 8/2016 | Fasano | H01H 9/443 |
| 9,437,376 B2 * | 9/2016 | Mattlar | H01H 9/443 |
| 9,673,004 B1 * | 6/2017 | Ruempler | H01H 9/44 |
| 9,679,720 B1 * | 6/2017 | Bugryn | H01H 9/443 |
| 9,805,887 B2 * | 10/2017 | Ferree | H01H 9/40 |
| 10,176,945 B2 * | 1/2019 | Domejean | H01H 9/36 |

(Continued)

FOREIGN PATENT DOCUMENTS

| | | |
|---|---|---|
| EP | 3144950 A1 | 3/2017 |
| EP | 3384512 A1 | 10/2018 |

OTHER PUBLICATIONS

European Extended Search Report, Application No. 20188715.5, dated Dec. 18, 2020, 10 pps.

*Primary Examiner* — William A Bolton
(74) *Attorney, Agent, or Firm* — Stanek Lemon Crouse & Meeks, P.A.

(57) ABSTRACT

The disclosure relates to the field of circuit breakers, in particular to an electrode for a circuit breaker and the circuit breaker, wherein the electrode includes an electrical terminal configured to input and output electrical power to the electrode, a stationary contact electrically connected to the electrical terminal and fixed to the electrical terminal, a movable contact configured to rotatably engage the stationary contact, an arc chute arranged on the electrical terminal and adjacent to the stationary contact, and a magnetic member arranged to generate a magnetic field force when the movable contact is disconnected from the stationary contact so as to push an arc formed between the movable contact and the stationary contact towards the arc chute.

11 Claims, 7 Drawing Sheets

(56) References Cited

U.S. PATENT DOCUMENTS

2013/0284702 A1 10/2013 Hamada et al.
2015/0243458 A1 8/2015 Britz

* cited by examiner

US 11,417,480 B2

1

ELECTRODE FOR A CIRCUIT BREAKER AND THE CIRCUIT BREAKER

CROSS REFERENCE TO RELATED APPLICATIONS

This patent application claims the benefit and priority of Chinese Patent Application No. 201921211364.9 filed on Jul. 30, 2019, the disclosure of which is incorporated by reference herein in its entirety as part of the present application.

BACKGROUND

The disclosure relates to the technical field of current switches, in particular to an electrode for a circuit breaker and a circuit breaker.

The existing circuit breaker generally has good performance when alternating-current short-circuited current is disconnected, and often cannot achieve satisfactory effect when direct-current short-circuited current is disconnected. As for the alternating-current circuit, since the current circuit is in a sine wave shape, the current passes through a zero point along with the change of the waveform. When a short circuit occurs, namely when an arc exists in the alternating-current circuit, a "zero-off" phenomenon of the circuit occurs, which is favorable for extinguishing the arc, so that it is easy for the circuit to break for the existing circuit breaker. However, since the current in the direct-current circuit is constant, the "zero-off" phenomenon does not occur, and therefore it is obviously impossible to obtain a good effect by applying the same circuit breaker to the direct-current circuit as those applied in the alternating-current circuit.

On this basis, it would still be highly desirable for a person skilled in the art to develop a circuit breaker which also has a good breaking effect for a direct-current short-circuited circuit so as to overcome the defects of the prior art. Since the structure of the breaking circuit in the circuit breaker mainly includes electrodes, it is also an urgent problem to provide an improved electrode.

BRIEF DESCRIPTION

The present disclosure provides an electrode for a circuit breaker and a circuit breaker, where by the above-mentioned disadvantages of the prior art are overcome.

One aspect of the present disclosure provides an electrode for a circuit breaker, including an electrical terminal configured to input and output electrical power to the electrode, a stationary contact electrically connected to the electrical terminal and fixed to the electrical terminal, a movable contact configured to rotatably engage the stationary contact, an arc chute arranged on the electrical terminal and adjacent to the stationary contact, and a magnetic member arranged to generate a magnetic field force when the movable contact is disconnected from the stationary contact so as to push an arc formed between the movable contact and the stationary contact towards the arc chute.

The movable contact may include a rotating arm and a first contact end at one end or two ends of the rotating arm, the stationary contact includes a second contact end, and the second contact end is arranged on the electrical terminal to correspond to the first contact end, and the electrode further includes a first insert, the first insert being configured to receive the magnetic member and arranged to be coupled to a housing for receiving the electrode to enable the magnetic field force generated by the magnetic member to be directed towards the arc chute when the housing encapsulates the electrode therein.

The movable contact may include a rotating arm and a first contact end at one or both ends of the rotating arm, the magnetic member being arranged on the rotating arm, the stationary contact includes a second contact end which is arranged on the electrical terminal to correspond to the first contact end, the electrical terminal being provided with a dodging channel configured to receive the magnetic member when the first contact end contacts the second contact end, and the magnetic member is fixed to the rotating arm and moves along with the rotating arm, and the magnetic member is configured to direct the magnetic field force towards the arc chute when the first contact end is disconnected from the second contact end.

The electrode further may include a second insert configured to receive the magnetic member and fixed to the rotating arm such that the magnetic field force generated by the magnetic member is directed towards the arc chute.

The second insert and the rotating arm may be fixed to each other by plugging or snapping.

The first insert and the second insert may be configured to be heated to generate gas and push the arc towards the arc chute when the arc is generated.

The magnetic member may include a pair of permanent magnets arranged oppositely on both sides of the second contact end.

The pair of permanent magnets may be arranged with same orientation and attitude.

The permanent magnet may be configured in a rectangular, square, sector, or semi-circular shape.

Another aspect of the present disclosure provides a circuit breaker including an electrode as described above, the circuit breaker being configured with a plurality of electrodes connected in series.

Other features and advantages of the present disclosure will be in part apparent to those skilled in the art upon reading the present disclosure, and in part will be described in the following detailed description in conjunction with the accompanying drawings.

BRIEF DESCRIPTION OF THE DRAWINGS

Hereinafter, embodiments of the disclosure will be described in detail with reference to the accompanying drawings, in which.

DETAILED DESCRIPTION

Figure 1:
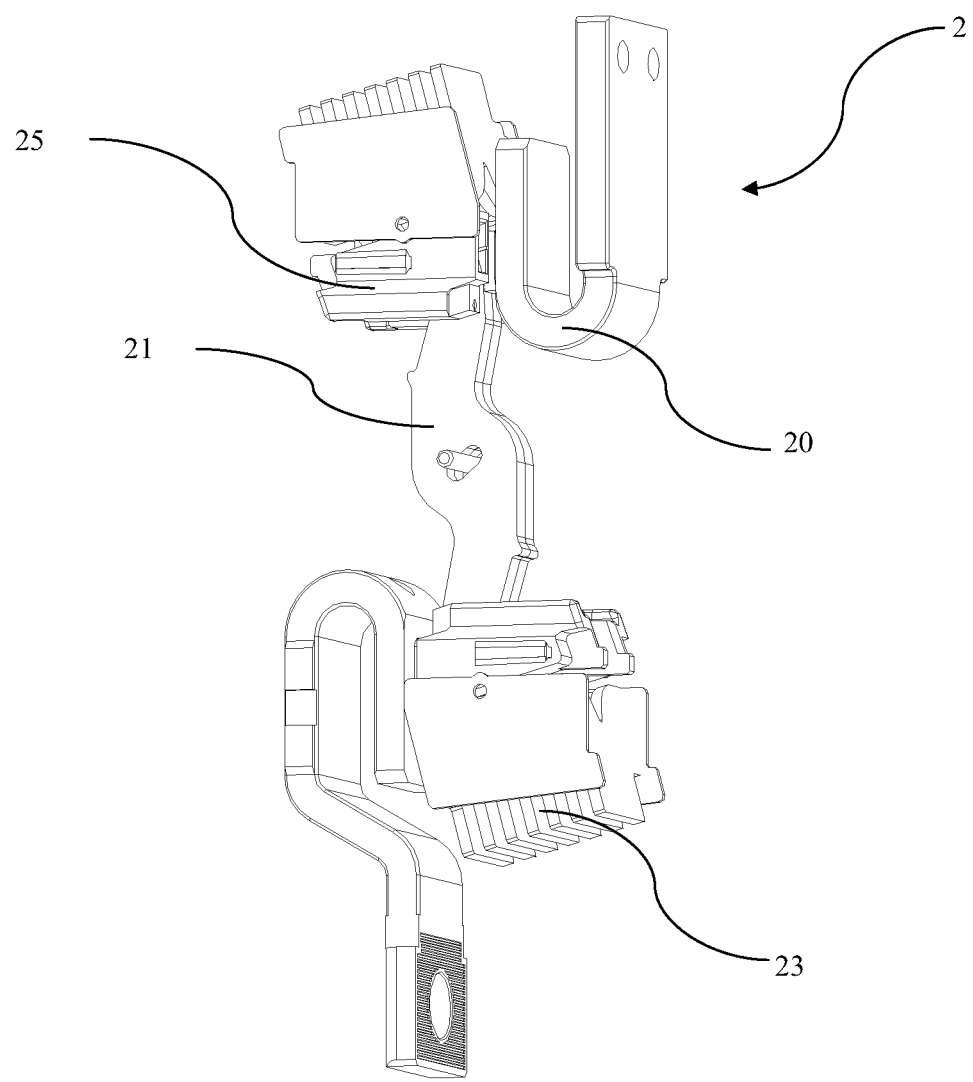
FIG. 1 is a perspective view of an electrode of the present disclosure.

An exemplary solution of an electrode for a circuit breaker and the circuit breaker according to the present disclosure will now be described in detail with reference to the accompanying drawings. The drawings are provided to present various embodiments of the present disclosure, but are not necessarily drawn to scale of specific embodiments, and certain features may be exaggerated, removed, or partially broken away to better illustrate and explain the disclosure of the present disclosure. Some of the components in the drawings can be adjusted in location according to actual requirements without affecting technical effects. The appearances of the phrase "in the drawings" or similar language in the specification are not necessarily referring to all the figures or examples.

Certain directional terms used hereinafter to describe the drawings, such as "inner", "outer", "upper", "lower", and other directional terms, will be understood with their normal meaning and refer to those directions where the drawings are normally viewed. Unless otherwise indicated, directional terms described herein generally follow conventional directions as understood by those skilled in the art.

The terms "first", "first something", "second", "second something", and the like, as used in this disclosure, do not denote any order, quantity, or importance in this disclosure, but rather are used to distinguish one element from another.

With reference to FIGS. 1 to 7, the present disclosure provides a circuit breaker 1 including a housing 3, a cover 4, an electrode 2, an actuating mechanism, and a tripping mechanism. The electrode 2 is enclosed in an inner space formed by the housing 3 and a cover 4, four electrodes 2 in series being shown here by way of example. The housing 3 and the cover member are configured to form an inner space adapted to a shape of the electrode 2 after assembly. When a load circuit is short-circuited, the tripping mechanism acts in response to the disconnection of the electrode 2, and further enables the actuating mechanism to completely disconnect the short-circuited circuit in response to the action of the tripping mechanism.

As shown in FIGS. 1 to 4, the electrode 2 for the above-mentioned circuit breaker 1 includes an electrical terminal 20, a stationary contact 22, a movable contact 21, an arc chute 23, and a magnetic member 24. Herein, the electrical terminal 20 has a U-shaped configuration, which is, of course, only one exemplary structure. The electrical terminal 20 is used primarily for input and output electrical power in a load circuit. The stationary contact 22 is generally fixedly disposed on the electrical terminal 20 and electrically connected to the electrical terminal 20. The movable contact 21 can move relative to the stationary contact 22. When the load circuit is normal, the movable contact 21 can engage the stationary contact 22 to complete the load circuit. When a short circuit occurs in the load circuit, the movable contact 21 can be disconnected from the stationary contact 22 to protect load equipment in the load circuit from damage. Since an arc is generated between the movable contact 21 and the stationary contact 22 during the disconnection of the movable contact 21 from the stationary contact 22 when the load circuit is short-circuited, the arc may cause delayed breaking of the circuit, burn-out of the contact, or even burning or explosion of load equipment in the circuit. The arc chute 23 generally divides the entered arc into a plurality of small arcs after the electric repulsion force separates the movable contact 21 and the stationary contact 22, so that the purpose of arc extinguishing is achieved. Here, the arc chute 23 is arranged on the electrical terminal 20, and as shown, the arc chute 23 is positioned above the stationary contact 22 to completely cover the arc within its range when the arc is generated.

The magnetic member 24 of the disclosure is arranged adjacent the movable contact 21 and the stationary contact 22. When the movable contact 21 and the stationary contact 22 are disconnected, the arc generated between the movable contact 21 and the stationary contact 22 is always in a magnetic field formed by the magnetic member 24. According to the left-hand rule, the magnetic member 24 can generate a magnetic field force directed towards the arc chute 23. Under the action of the magnetic field force, especially Lorentz force, the arc generated between the stationary contact 22 and the movable contact 21 is pushed towards the arc chute 23, thereby improving the ability of the circuit breaker 1 to disconnect the direct-current short-circuited current.

Figure 2:
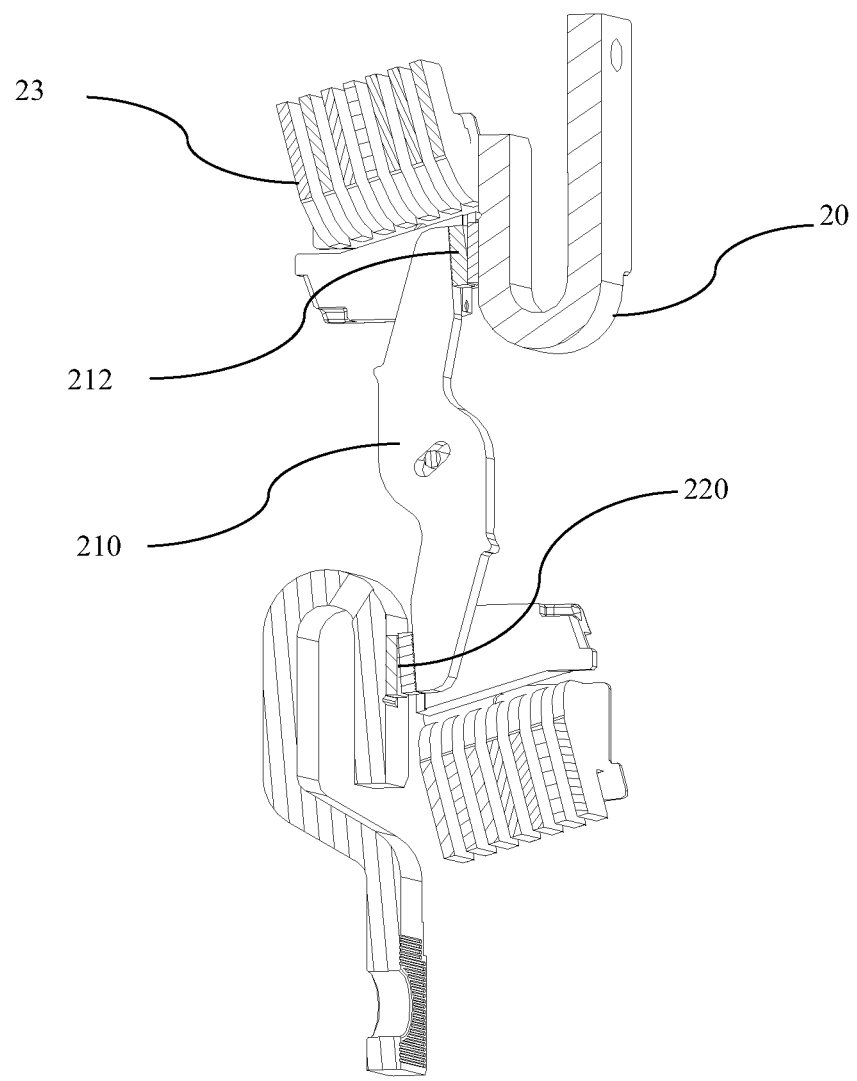
FIG. 2 is a cross-sectional view of FIG. 1.

Specifically with reference to FIG. 2, the movable contact 21 includes a rotating arm 210 and a first contact end 212 disposed at an end of the rotating arm 210. The rotating arm 210 may have one or two contact ends, that is, the electrode 2 including the movable contact 21 described above may be constructed in a single breakpoint type or a double breakpoint type. In the embodiment shown in the figure, the electrode 2 is of a double breakpoint type. The rotating arm 210 is approximately "i" shape and rotates about a central axis that is linked to the actuating mechanism and acted upon by the actuating mechanism to eventually disconnect the movable contact 21 and stationary contact 22, thereby disconnecting the direct-current short-circuited current to protect the load equipment in the circuit.

With reference to FIG. 2, the stationary contact 22 includes a second contact end 220 arranged on the electrical terminal 20 to correspond to the first contact end 212 of the movable contact 21, i.e., the second contact end 220 is disposed at a position to meet the requirement of the engagement with the first contact end 212. Preferably when the first contact end 212 engages the second contact end 220, the first contact end 212 and the second contact end 220 have maximum contact surface.

Figure 4:
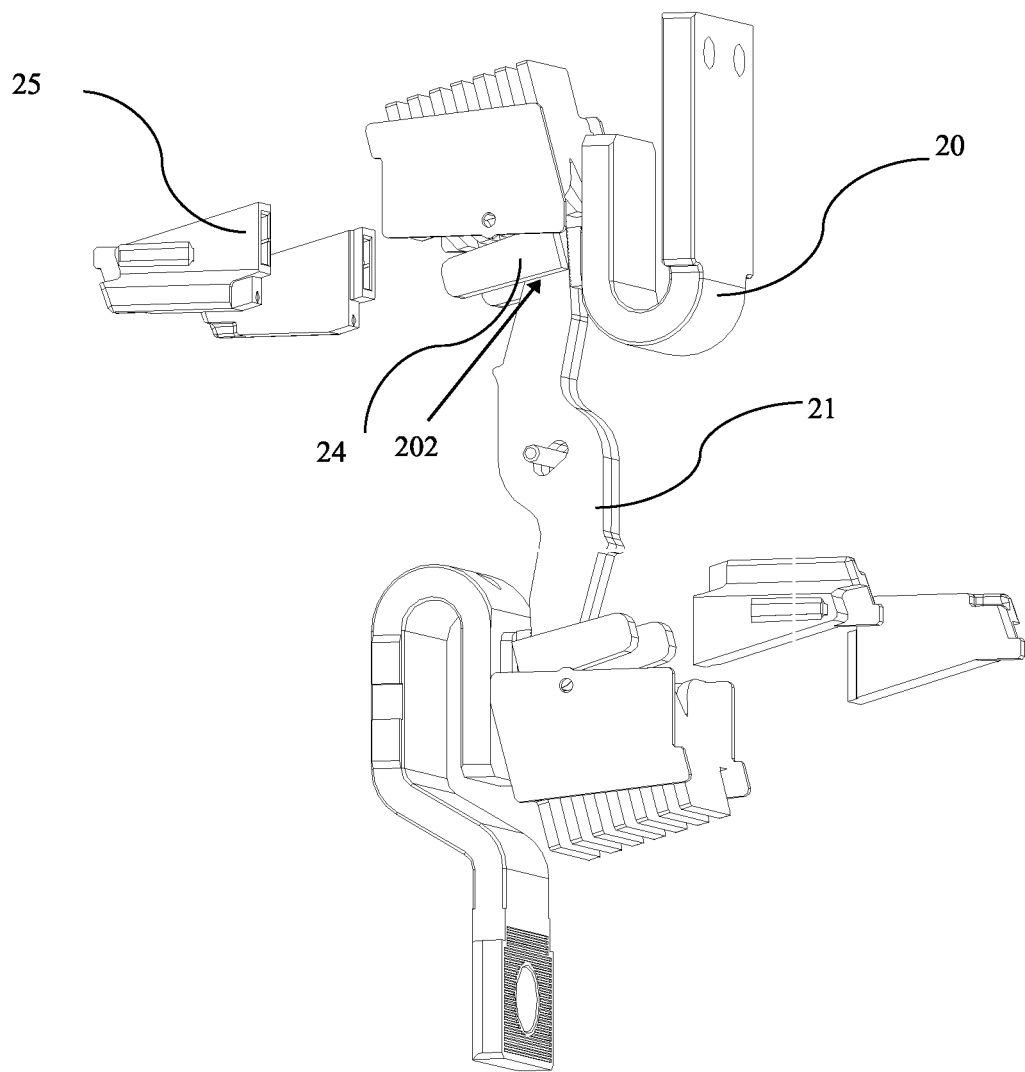
FIG. 4 is an exploded view of an electrode of the present disclosure.
Figure 5:
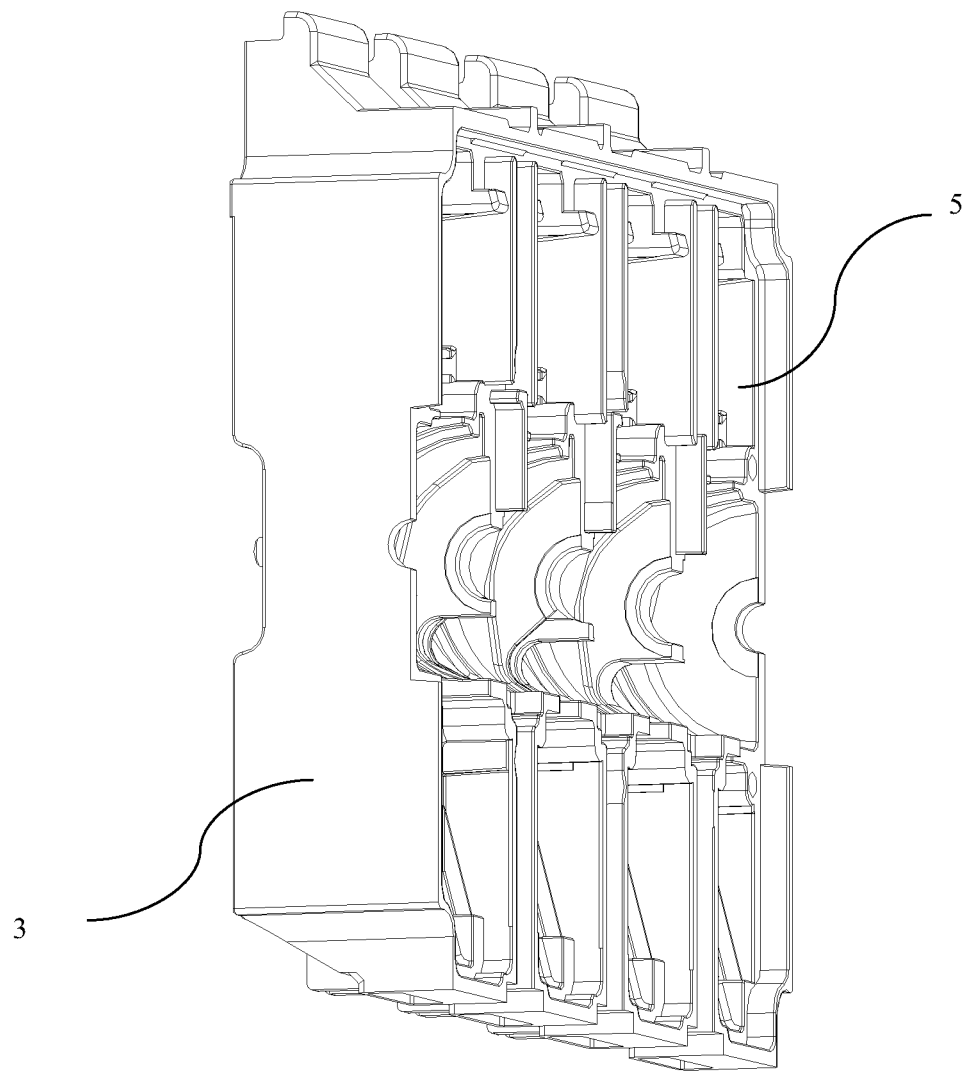
FIG. 5 is a perspective view of a housing.
Figure 6:
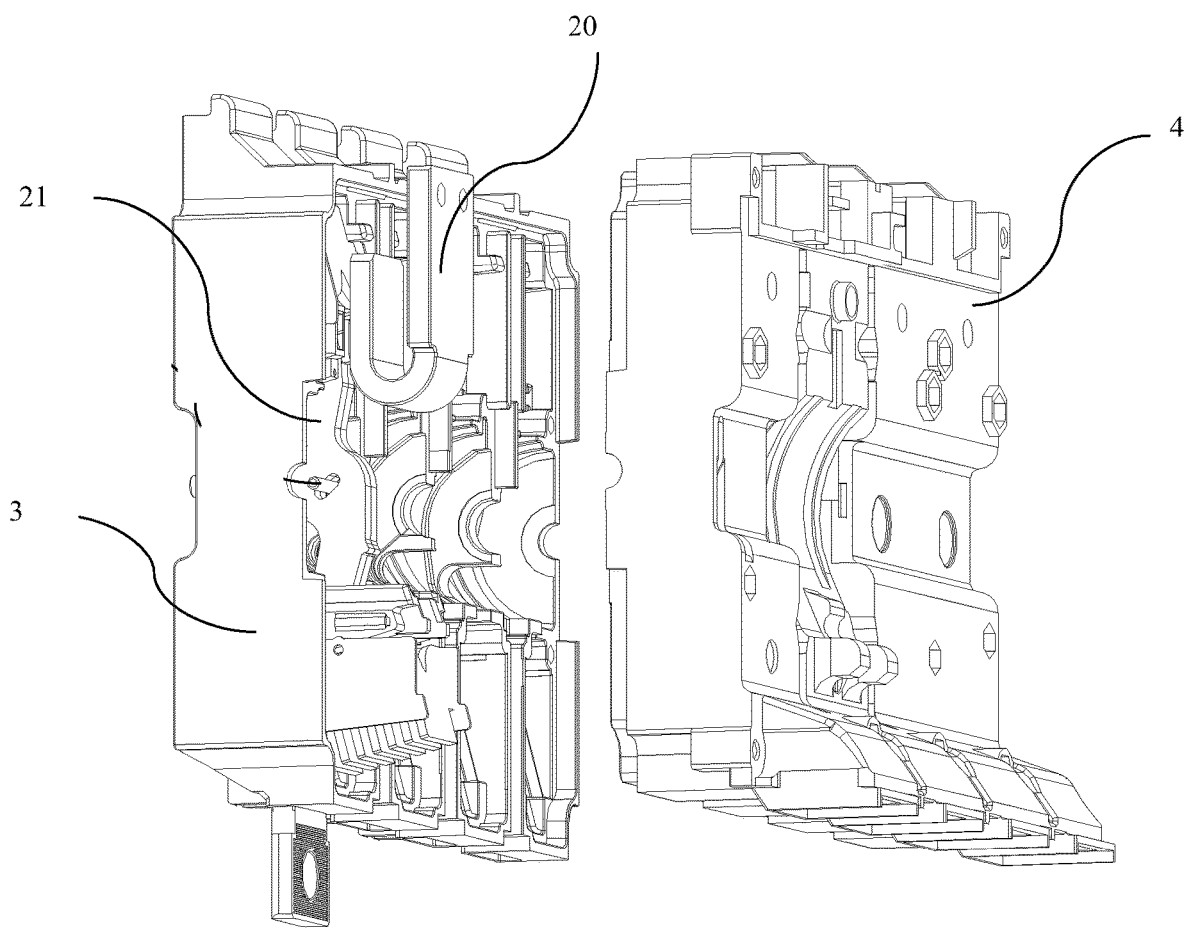
FIG. 6 is a perspective view of a cover and the housing.

In the embodiment shown in FIGS. 1 and 4, the electrode 2 further includes a first insert 25 having a socket in which the magnetic member 24 can be received. As shown, a rectangular magnetic member is illustratively shown, and the socket is also configured as a rectangular slot in which the magnetic member may be fully received or partially received. When the housing 3 and the cover 4 enclose the electrode 2 in the inner space formed therebetween, the first insert 25 is coupled to the housing 3 and is located just near the movable contact 21 and the stationary contact 22. In particular the first insert 25 is located on both sides of the movable contact 21 (in an orientation parallel to an axis of rotation of the movable contact) and covers a trajectory of movement of the movable contact 21 with respect to the stationary contact 22, in particular, a trajectory of movement of the first contact end 212 with respect to the second contact end 220. The first insert 25 is provided with a protrusion at a side close to the housing 3, a groove is provided at a corresponding position on the housing 3, and the first insert 25 is fixed to the housing 3 by the cooperation of the protrusion and the groove. The projection may be configured in a trapezoidal shape with the groove arranged to match the shape thereof. Of course, the positions of the projection and the groove can be interchanged, and engagement manner of the first insert 25 with the housing 3 is also not limited thereto, and plugging, clamping or gluing is possible. It would occur to a person skilled in the art to make appropriate modifications to the technical solution provided by the present disclosure so as to realize accurate arrangement of the position of the magnetic member.

Figure 3:
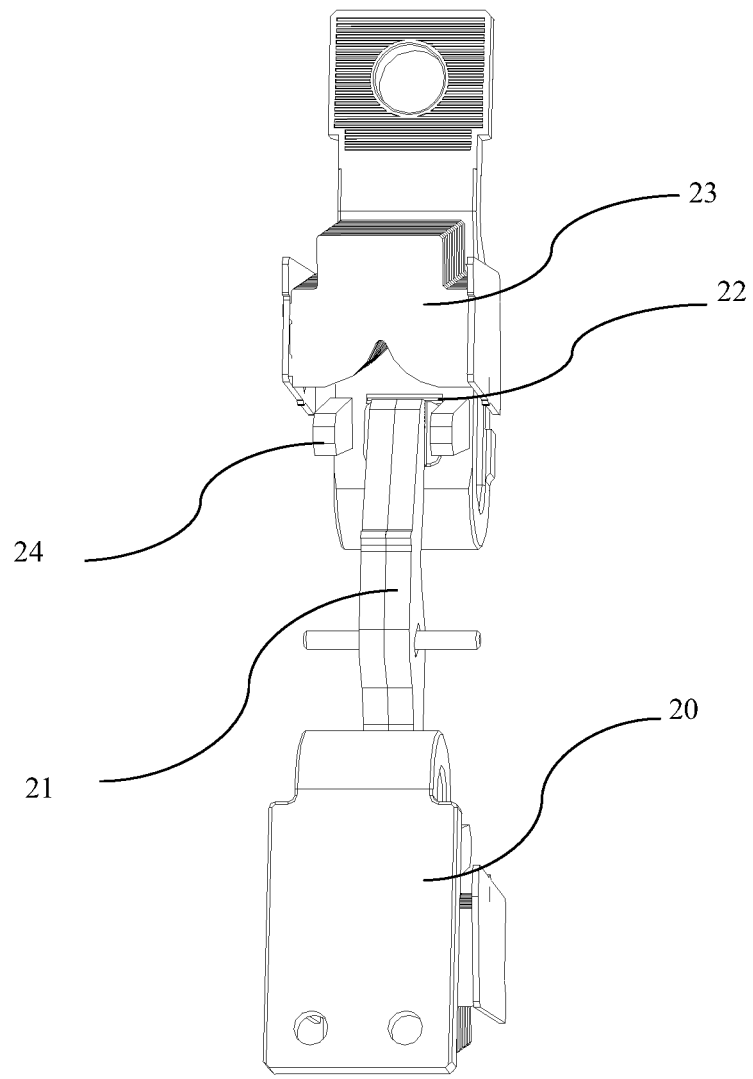
FIG. 3 is another perspective view of an electrode of the present disclosure.

In the present disclosure, as shown in FIG. 3, the magnetic member 24 includes a pair of permanent magnets which are oppositely disposed and distributed on both lateral sides of the second contact end 220 of the stationary contact 22, that is, the lateral direction is a direction parallel to an axial direction of a central axis (axis of rotation) of the movable contact 21, as shown in the figures. The permanent magnets may be arranged with maximum identical orientation and attitude (with maximum area overlapping one another) to generate a magnetic field of sufficient strength to facilitate the generation of Lorentz force sufficient to push the arc towards the arc chute 23. A shape of the permanent magnet may be rectangular, square, sector, or semi-circular shape. Of course, the list is not exhaustive, and it would occur to a person skilled in the art to apply other shapes of permanent magnets thereto on the basis of the present disclosure.

In addition to fixing the magnetic member 24 to the housing 3, in another embodiment, the magnetic member 24 may also be arranged on the movable contact 21. As described above, the movable contact 21 includes a rotating arm 210 on which the magnetic member 24 is specifically disposed and first contact ends 212 arranged at both ends of the rotating arm 210. During movement of the movable contact 21, the magnetic member 24 moves synchronously along with the rotating arm 210. To achieve a high degree of space utilization, the electrical terminal 20 may be provided with a dodging channel 202, and the magnetic member 24 may be partially received in the dodging channel 202 of the electrical terminal 20 when the first contact end 212 of the movable contact 21 engages the second contact end 220 of the stationary contact 22. When the first contact end 212 of the movable contact 21 is disconnected from the second contact end 220 of the stationary contact 22, the magnetic member 24 gradually moves away from the dodging channel 202 as the movable contact 21 moves and always applies a generated magnetic field to the arc generated between the first contact end 212 and the second contact end 220 during the movement so that the arc moves towards the arc chute 23 under the effect of the Lorentz force.

In embodiments where the magnetic member 24 is disposed on the movable contact 21, a pair of permanent magnets may be snapped or plugged onto the rotating arm 210 by a physical structure such as a shaft. Alternatively, the fixed connection on the rotating arm 210 may also be achieved by a second insert. The second insert is provided with a socket in which the permanent magnet can be received, and the pair of permanent magnets is respectively received in the pair of second inserts. A side, facing the rotating arm 210, of the second insert may be provided with a protrusion, and a corresponding side of the rotating arm 210 may be provided with a groove, the second insert being then fixed to the rotating arm 210 by cooperation of the groove and the protrusion. In order to further stabilize the second insert, a connecting rib may be provided between the pair of second inserts, the connecting rib abutting on the rotating arm 210 when the pair of second inserts is arranged on both sides of the rotating arm 210 to avoid possible slippage of the projection within the groove. Alternatively, an interference fit between the second insert and the rotating arm 210 may be used to fix the second insert. The second insert may alternatively be configured to be the same as or similar in the term of structure with the first insert 25, such as in shape, size, socket configuration, etc., but with adaptive modifications in the position of particular engagement to the housing or rotating arm. Such modifications may be made with reference to what is specifically set forth above and below, but are not exhaustive of possible modifications.

In addition, it is also contemplated that the magnetic member 24 may be disposed on the electrical terminal 20, still on both lateral sides of the second contact end 220, and the magnetic member 24 may be plugged or snapped onto the electrical terminal 20. Other configurations and manners for fixing the magnetic member 24 to the electrical terminal 20 that can be contemplated fall within the scope of the present disclosure.

In the embodiment described above in which the first insert 25 or the second insert is used to position the magnetic member 24, with reference to FIG. 4, the first insert 25 and the second insert may be made of a gas generating material, such as nylon, melamine, etc. A large amount of heat is generated while the movable contact 21 and the stationary contact 22 are disconnected to generate an arc, and the heat enables the first insert 25 and the second insert made of the gas generating material to generate gas. The gas generated by the gas generating material usually contains $H_2$, and $H_2$ (Hydrogen) has good thermal conductivity so as to be capable of cooling the arc and pushing the arc towards the arc chute 23 to further enhance disconnection capacity of the circuit breaker 1.

Figure 7:
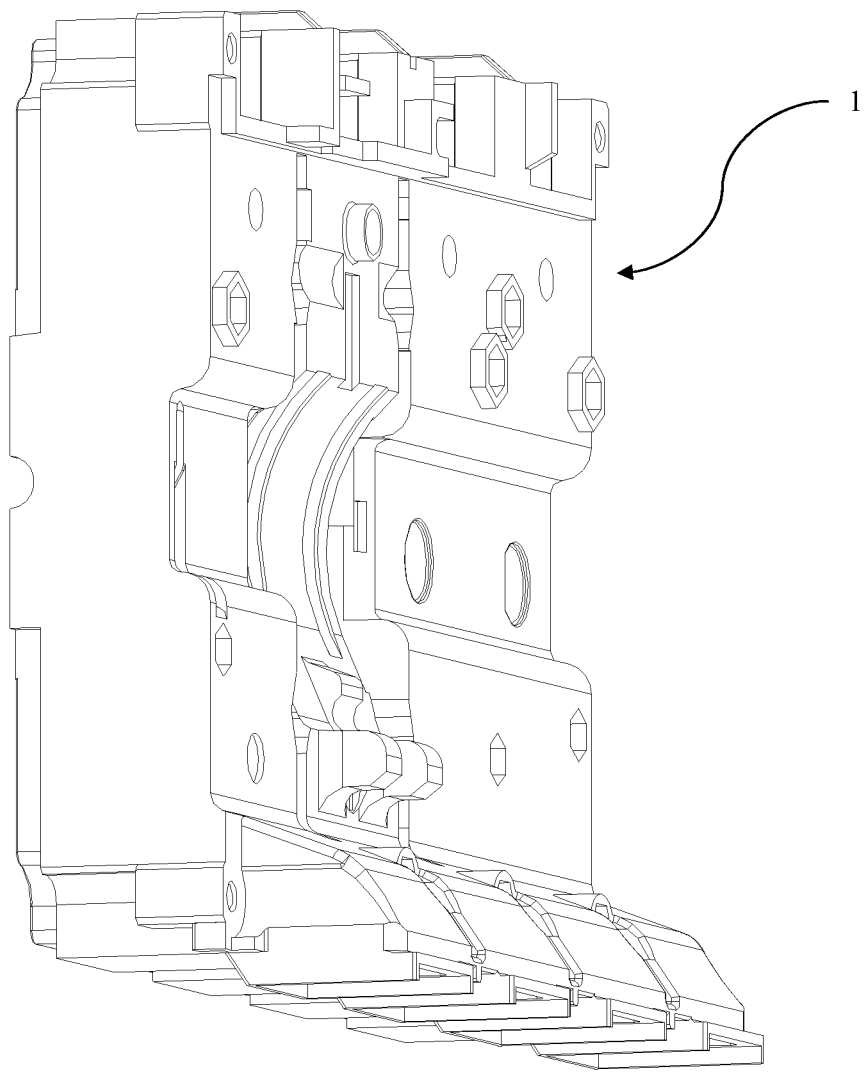
FIG. 7 is a perspective view of a circuit breaker.

During use of the circuit breaker 1 as shown in FIG. 7, one or more electrodes 2 are arranged in the inner space defined by the housing 3 and the cover 4. In the case of a plurality of electrodes 2, such as four electrodes 2, the electrodes 2 may be arranged in series in the inner space. In an example embodiment of the present disclosure, a double breakpoint type electrode 2 is employed in the circuit breaker 1. The double breakpoint type electrode 2 has an opening distance about twice that of the conventional direct-current breaker 1 when the movable contact 21 and the stationary contact 22 are disconnected, which is favorable for improving the disconnection capacity of the breaker 1. Permanent magnets are located on both lateral sides of the second contact end 220 of the stationary contact 22, and a pair of permanent magnets are preferably arranged at a closest distance to ensure that the movable contact 21 moves (the movable contact 21 moves within the spacing between the pair of permanent magnets). In a normal direct-current circuit, the circuit breaker 1 functions to transmit current in the circuit, and in a short-circuited DC circuit, the circuit breaker 1 may disconnect the circuit when a rated current is exceeded by no less than about 1.05 times so as to ensure the safety of load equipment.

During the direct-current short-circuited current, the disconnection of the circuit breaker 1 is mainly realized by the disconnection of the movable contact 21 and the stationary contact 22 of the electrode 2. However, during the disconnection of the movable contact 21 and the stationary contact 22, an arc is easily generated, and as described above, the arc is not conducive to the disconnection of the movable contact 21 and the stationary contact 22, and even causes damage to load equipment in the circuit. The provision of the magnetic member 24 well solves the problem of poor capability of the conventional circuit breaker 1 in disconnecting a direct-current short-circuited current. The magnetic member 24 is arranged on both lateral sides of the second contact end 220. As shown in the figure, assuming that a direction of current in the direct-current circuit is from top to bottom, a permanent magnet arranged on left side is set as an N pole and a permanent magnet arranged on right side is set as an S pole. According to the left hand rule, a Lorentz force will be generated when the first contact end 212 of the movable contact 21 is disconnected from the second contact end 220 of the stationary contact 22. The Lorentz force is directed toward the arc chute 23 disposed above the permanent magnet, thereby pushing the arc generated between the first contact end 212 and the second contact end 220 towards the arc chute 23 to achieve rapid arc extinguishing. When the direction of the current in the direct-current circuit is from bottom to top, the permanent magnet on the left side should be set as an S pole, and the permanent magnet on the right side should be set as an N pole, so that according to the left hand rule the Lorentz force will be generated and push the arc to the arc chute 23 when the first contact end 212 of the movable contact 21 is disconnected from the second contact end 220 of the stationary contact 22, thereby effectively extinguishing the arc.

Although the present disclosure has been described only with respect to the case where the electrode is applied to a molded case circuit breaker, it would occur to a person skilled in the art that the electrode provided by the present disclosure is not limited to being used only in a molded case circuit breaker, and other types of circuit breakers in the field of circuit breakers (e.g., frame circuit breakers, miniature circuit breakers, earth leakage circuit breakers, etc.) may also use the above-mentioned electrode to increase the disconnection capacity of the circuit breaker in an overload or short-circuited circuit.

Although the present disclosure is described in detail with only a limited number of embodiments, it should be readily understood that the present disclosure is not limited to the disclosed embodiments. Rather, the present disclosure may be modified by incorporating any number of variations, changes, substitutions, or equivalents not previously described, which are commensurate with the spirit and scope of the present disclosure. Furthermore, although various embodiments of the present disclosure have been described, it is to be understood that aspects of the present disclosure may include only some of the embodiments. Therefore, the present disclosure is not to be considered as being limited by the foregoing description, but only by the appended claims.

The invention claimed is:

1. A conductor assembly for a circuit breaker comprising:
    an electrical terminal configured to input and output electrical power to the conductor assembly;
    a stationary contact electrically connected to the electrical terminal and fixed to the electrical terminal;
    a movable contact configured to rotatably engage the stationary contact, wherein the movable contact comprises a rotating arm and a first contact end at one or both ends of the rotating arm;
    an arc chute arranged on the electrical terminal and adjacent to the stationary contact; and
    a magnetic member arranged to generate a magnetic field force when the movable contact is disconnected from the stationary contact so as to push an arc formed between the movable contact and the stationary contact towards the arc chute, wherein the magnetic member is fixed to the rotating arm,
    wherein the stationary contact comprises a second contact end arranged on the electrical terminal to correspond to the first contact end,
    wherein the electrical terminal is provided with a dodging channel configured to receive the magnetic member when the first contact end contacts the second contact end.

2. The conductor assembly according to claim 1, wherein the conductor assembly further comprises a first insert, the first insert being configured to receive the magnetic member and arranged to be coupled to a housing for receiving the conductor assembly to enable the magnetic field force generated by the magnetic member to be directed towards the arc chute when the housing encapsulates the conductor assembly therein.

3. The conductor assembly according to claim 2, wherein the first insert is configured to be heated to generate gas and push the arc towards the arc chute when the arc is generated.

4. The conductor assembly according to claim 2, wherein the magnetic member comprises a pair of permanent magnets arranged oppositely on both sides of the second contact end.

5. The conductor assembly according to claim 4, wherein the pair of permanent magnets are arranged with same orientation and attitude.

6. The conductor assembly according to claim 4, wherein the permanent magnet is configured in a rectangular, square, sector, or semi-circular shape.

7. The conductor assembly according to claim 1, wherein the magnetic member moves along with the rotating arm, and the magnetic member is configured to direct the magnetic field force towards the arc chute when the first contact end is disconnected from the second contact end.

8. The conductor assembly according to claim 7, further comprising a second insert configured to receive the magnetic member and fixed to the rotating arm such that the magnetic field force generated by the magnetic member is directed towards the arc chute.

9. The conductor assembly according to claim 8, wherein the second insert and the rotating arm are fixed to each other by plugging or snapping.

10. The conductor assembly according to claim 8, wherein the second insert is configured to be heated to generate gas and push the arc towards the arc chute when the arc is generated.

11. A circuit breaker, wherein the circuit breaker comprises a conductor assembly according to claim 1, the circuit breaker configured with a plurality of conductor assemblies connected in series electrically.

* * * * *

UNITED STATES PATENT AND TRADEMARK OFFICE
CERTIFICATE OF CORRECTION

PATENT NO. : 11,417,480 B2
APPLICATION NO. : 16/941904
DATED : August 16, 2022
INVENTOR(S) : Guo et al.

Page 1 of 1

It is certified that error appears in the above-identified patent and that said Letters Patent is hereby corrected as shown below:

On the Title Page

Item (71) Applicant: Please correct "Jiangsu (CN)" to read -- Suzhou (CN) --

In the Specification

Column 4, Line 18: Please correct ""i" shape and rotates" to read -- "٦" shape and rotates --

Signed and Sealed this
Eleventh Day of October, 2022

*Katherine Kelly Vidal*

Katherine Kelly Vidal
*Director of the United States Patent and Trademark Office*